May 20, 1924.
H. CRADDOCK
1,494,995
BAND SAW SHARPENER AND SETTING MACHINE
Filed Oct. 28, 1922    2 Sheets-Sheet 1
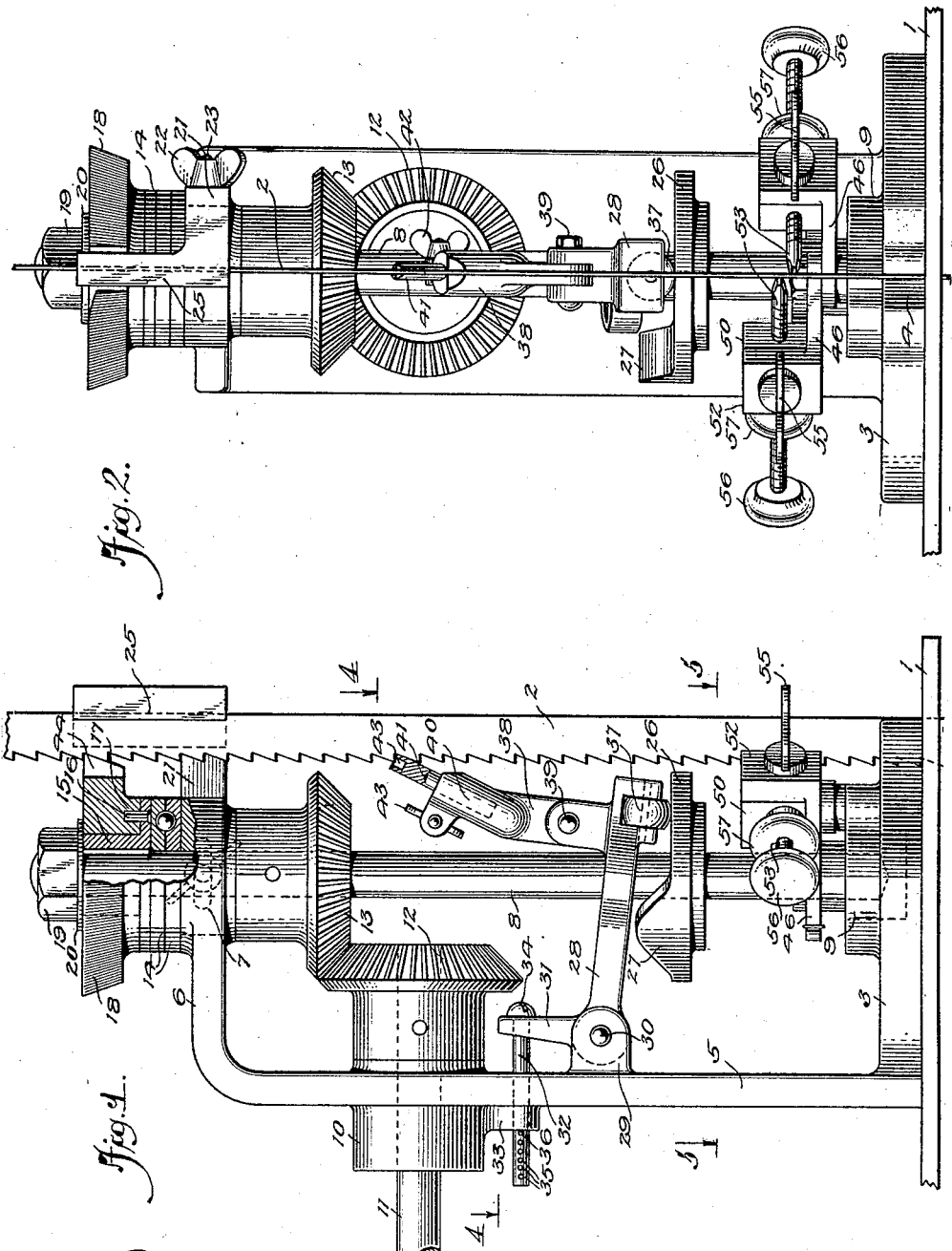
INVENTOR
Henry Craddock May 20, 1924.　　　　　　　　　　　　　　　　　　　1,494,995
H. CRADDOCK
BAND SAW SHARPENER AND SETTING MACHINE
Filed Oct. 28, 1922　　2 Sheets-Sheet 2

WITNESSES

INVENTOR
Henry Craddock
BY
ATTORNEYS

Patented May 20, 1924.

1,494,995

UNITED STATES PATENT OFFICE.

HENRY CRADDOCK, OF RENSSELAER, NEW YORK.

BAND-SAW SHARPENER AND SETTING MACHINE.

Application filed October 28, 1922. Serial No. 597,679.

*To all whom it may concern:*

Be it known that I, HENRY CRADDOCK, a citizen of the United States, and a resident of Rensselaer, in the county of Rensselaer, State of New York, have invented a new and Improved Band-Saw Sharpener and Setting Machine, of which the following is a full, clear, and exact description.

This invention relates to improvements in band saw sharpeners and setting machines, and more particularly to a motor or belt driven vertical band saw sharpener and setting machine, an object of the invention being to provide a machine of the character stated, which can be placed in operative position with relation to the saw without the necessity of removing the saw from its frame, and which saves valuable room and equipment for holding the saws while being sharpened and set.

A further object is to provide a machine of the character stated, which will be relatively small in size, which can be easily positioned for use, which can be manufactured and sold at a reasonably low price, which will be automatic in its operation, and which will most efficiently perform the functions for which it is intended.

With these and other objects in view, the invention consists in certain novel features of construction and combinations, and arrangement of parts, as will be more fully hereinafter described and pointed out in the claims.

In the accompanying drawings—

Figure 1 is a view in side elevation partly in section illustrating my improved machine in operative position.

Figure 2 is a view in elevation at right angles to Figure 1.

Figure 3:
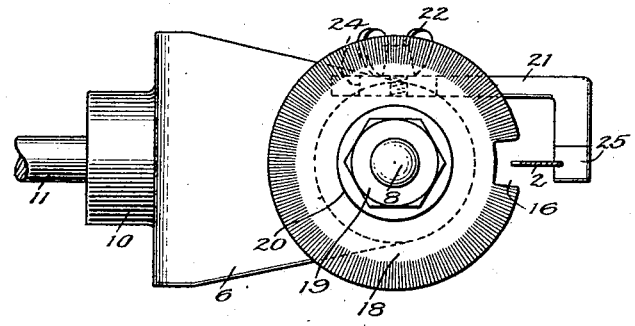
Figure 3 is a top plan view.

1 represents a band saw table and 2 a vertically positioned band saw.

3 represents the base of my improved machine which may be positioned on the table 1 and is provided with a recess 4 in one edge for the accommodation of the saw 2.

A standard 5 is fixed to the base 3, and is provided at its upper end with a horizontal arm 6 parallel with base 3. The arm 6 is made with a bearing 7 for a vertical shaft 8, the latter having a thrust bearing 9 on base 3.

The standard 5 is provided with a bearing 10 in which a drive shaft 11 is mounted, and this shaft 11 may be driven in any desired manner to operate the machine as will be hereinafter described.

A pair of miter gears 12 and 13 connect the shafts 11 and 8 and an anti-friction bearing 14 is provided around the shaft 8 above the arm 6 to receive the thrust of a keyed bushing 15, the latter having a pin 16 which projects upwardly into a notch 17 in a rotary file 18. This file 18 is beveled or shaped to correspond with the shape of the teeth of the saw and is clamped on the bushing by means of a nut 19 screwed onto the upper end of shaft 8 and having a washer 20 interposed between the nut and the bushing, so that the files can be changed to suit the teeth of the saw or for renewal when worn.

The bracket arm 21 is adjustably secured to one side of the arm 6 by means of a wing nut 22. This wing nut being screwed to the end of a stud 23 fixed to the arm 6 and projecting through a slot 24 in the arm 21.

A vertically grooved saw guide 25 is fixed to the free end of arm 21 and by reason of the adjustment of said arm this guide can be positioned as desired so that it will properly hold the saw in position for engagement by the rotary file 18.

A turn table 26 is fixed to the shaft 8 and provided with a cam 27 which functions to intermittently move a pivoted lever 28. This lever 28 is pivotally connected to a bifurcated bracket 29 on standard 5 by means of a pivot pin 30, and is formed at its pivoted end with a fork 31 straddling a stop pin 32. This stop pin 32 is positioned through the standard 5 and through a lug 33 on bearing 10 and is formed with a head 34 at its inner end, which limits the downward pivotal movement of lever 28.

The other end of the pin 32 is formed with a longitudinal series of openings 35 to receive in any of them a cross pin 36 to permit longitudinal adjustment of the pin 32 in accordance with the movement desired for the lever and the corresponding length of the teeth of the saw as will be readily understood.

The lever 28 is provided with a roller 37 which engages the turn table 26 and is engaged by the cam 27 and functions to reduce friction to a minimum.

A plunger 38 is pivotally connected to the lever 28 as shown at 39, and is formed at its outer end with a split clamping socket 40 for the reception of a plunger pin 41, the latter being clamped in the socket at the proper longitudinal adjustment by means of a wing screw 42. The plunger 41 is beveled at its outer end to correspond with the bevel of the saw teeth, and has a central recess 43 in its end to receive the point of the teeth and prevent the pin from engaging the point as it might injure the latter.

The file 18 is made with a recess 44 to accommodate the saw 2 and permit of its vertical step by step movement, and while I have shown the parts so arranged as to permit of a step movement at each complete revolution of the file, it is obvious that the parts may be so arranged to give as many step by step movements for a single revolution as may be desired.

A vertical post 45 is provided on the base 3 and provides pivotal mounting for a pair of jaws 46, the latter at their inner ends connected by coil springs 47 tending to separate the outer ends of the jaws, and a cam 48 is fixed to the shaft 8 and engages rollers 49 on the jaws 46 and forces the outer ends of the jaws toward each other.

Blocks 50 are supported on the jaws 46 and have dovetailed connection as shown at 51 with vertical members 52 on the jaws, and said blocks are vertically adjustable in said members 52 to properly position saw set punches 53 carried thereby.

To permit of this adjustment, the members 52 are made with vertically positioned slots 54 receiving wing screws 55 which are screwed into threaded sockets 56 in the blocks, and clamp the blocks at the desired vertical adjustment.

Figures 4, 5:
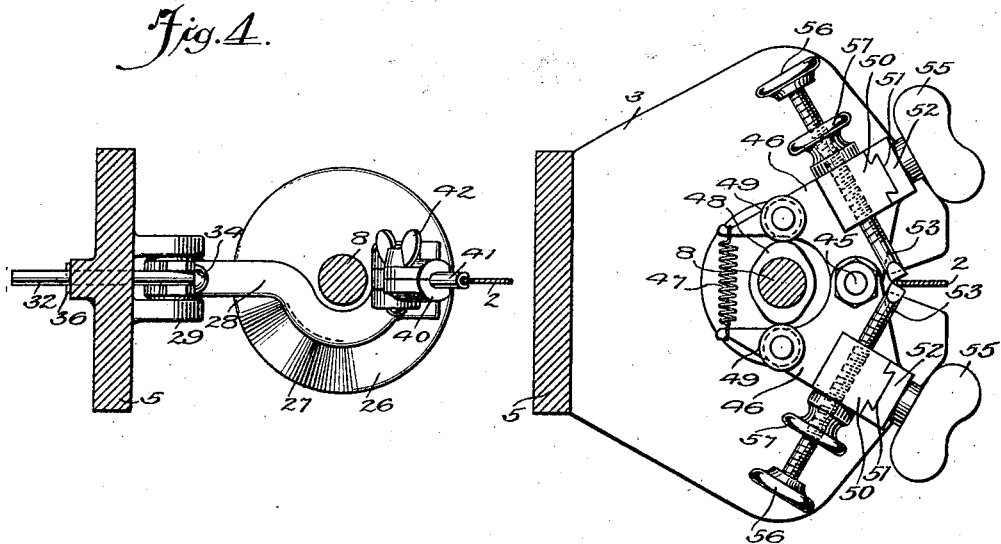
Figure 4 is a view in transverse section on the staggered line 4—4, of Figure 1.
Figure 5 is a view in transverse section on the line 5—5, of Figure 1.
Figure 6:
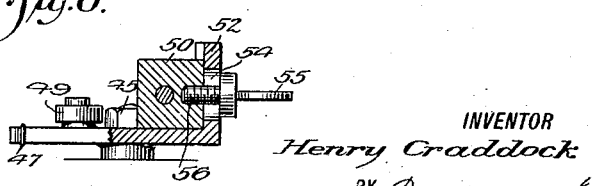
Figure 6 is a fragmentary view in side elevation illustrating a mounting for one of the saw set punches.

The saw set punches 53 have suitable beveled operating ends, and have screw threaded engagement with the blocks 50 to permit of their longitudinal adjustment as clearly shown in Figure 5. These punches 53 have heads 56 at their rear ends, and are locked in set position by lock nuts 57 as shown.

The operation is as follows: Rotary motion from drive shaft 11 is transmitted to shaft 8 through the medium of gears 12 and 13 and file 18 and turn table 16 are continuously revolved.

The file 18 sharpens the teeth, and the turn table 26 through the medium of its cam 27 causes the lever 28 to move the plunger pin 41 vertically a distance of one tooth of the saw at each complete revolution of the shaft, and hence the saw 2 will be moved vertically step by step to present the teeth of the saw in regular succession to the operation of the file. During this sharpening of the teeth, the cam 48 engages the rollers 49 to move the jaws 46 and force the saw set punches 53 toward each other to engage the teeth of the saw and properly set them.

Hence it will be noted that the operation of sharpening and setting is simultaneous and automatic, and it will be noted that the machine can be placed on the saw table and engage the saw without the necessity of disconnecting the saw from its frame.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

I claim:

1. A machine of the character stated, comprising a support, a vertical shaft mounted in the support, a rotary file mounted on said shaft adapted to sharpen the teeth of a band saw, said file having a peripheral recess to permit passage of the saw teeth, an adjustable vertical guide bracket projecting from said support laterally of said peripherally recessed file, said bracket adapted to receive and guide said band saw, a rotary cam, and a member operated by the cam to move said band saw through the peripheral recess vertically a distance of one tooth at each revolution of the cam.

2. A machine of the character stated comprising a rotary file, a rotary cam, a pivoted lever moved by the cam, and plunger pivotally connected to the lever, a pin adjustably carried by the plunger and engaging the teeth of the saw whereby the rotation of the cam causes an intermittent movement of the saw a distance of one tooth.

3. A machine of the character stated, comprising a rotary file having a recess therein for the passage of the teeth of a saw, a rotary cam turning with the file, a pivotally mounted lever moved by the cam, means for limiting the movement of the lever, an arm pivotally connected to the lever, and a plunger pin adjustable in the arm and having a recessed end receiving the point of the saw tooth and having a beveled end corresponding to the bevel of the teeth whereby the plunger functions to engage the base of the teeth and move the saw a distance of one tooth at each operation of the cam.

4. A machine of the character stated, comprising a rotary file, a pair of pivoted and spring pressed jaws, saw setting devices adjustably mounted in the jaws, a cam turning with the file and operating the jaws of the saw set devices simultaneously with the operation of the file, and means for moving the file a distance of one tooth at a time.

5. A machine of the character stated, comprising a support, a vertical shaft mounted in the support, a rotary file on the shaft adapted to sharpen the teeth of a saw, said file having a recess therein for the movement of the saw teeth therethrough, a pair of of pivoted jaws, a spring for separating the jaws, a cam on the shaft for forcing the jaws toward each other, blocks adjustably mounted in the jaws, and saw set plungers adjustable in the blocks and adapted to engage the teeth of the saw.

6. A machine of the character stated, comprising a support, a vertical shaft mounted in the support, a rotary file on the shaft adapted to sharpen the teeth of a saw, said file having a recess therein for the movement of the saw teeth therethrough, a pair of pivoted jaws, a spring for separating the jaws, a cam on the shaft for forcing the jaws toward each other, blocks adjustably mounted in the jaws, saw set plungers adjustable in the blocks and adapted to engage the teeth of the saw, a cam on the shaft, means operated by the cam to engage the saw teeth and move the saw a distance of one tooth at each operation of the cam.

7. A machine of the character stated, comprising a base, a standard on the base, a vertical shaft mounted in the standard and the base, a horizontal shaft supporting the standard, gears connecting said shafts, a recessed rotary file on the shaft, a bushing keyed to the shaft and receiving the file, a pin on the bushing positioned in a recess of the file, means for clamping the file on the bushing, saw set devices on the base, a cam on the shaft operating the saw set devices, a saw feeding device, and a cam on the vertical shaft operating the saw feeding device.

HENRY CRADDOCK.